Patented Oct. 28, 1924.

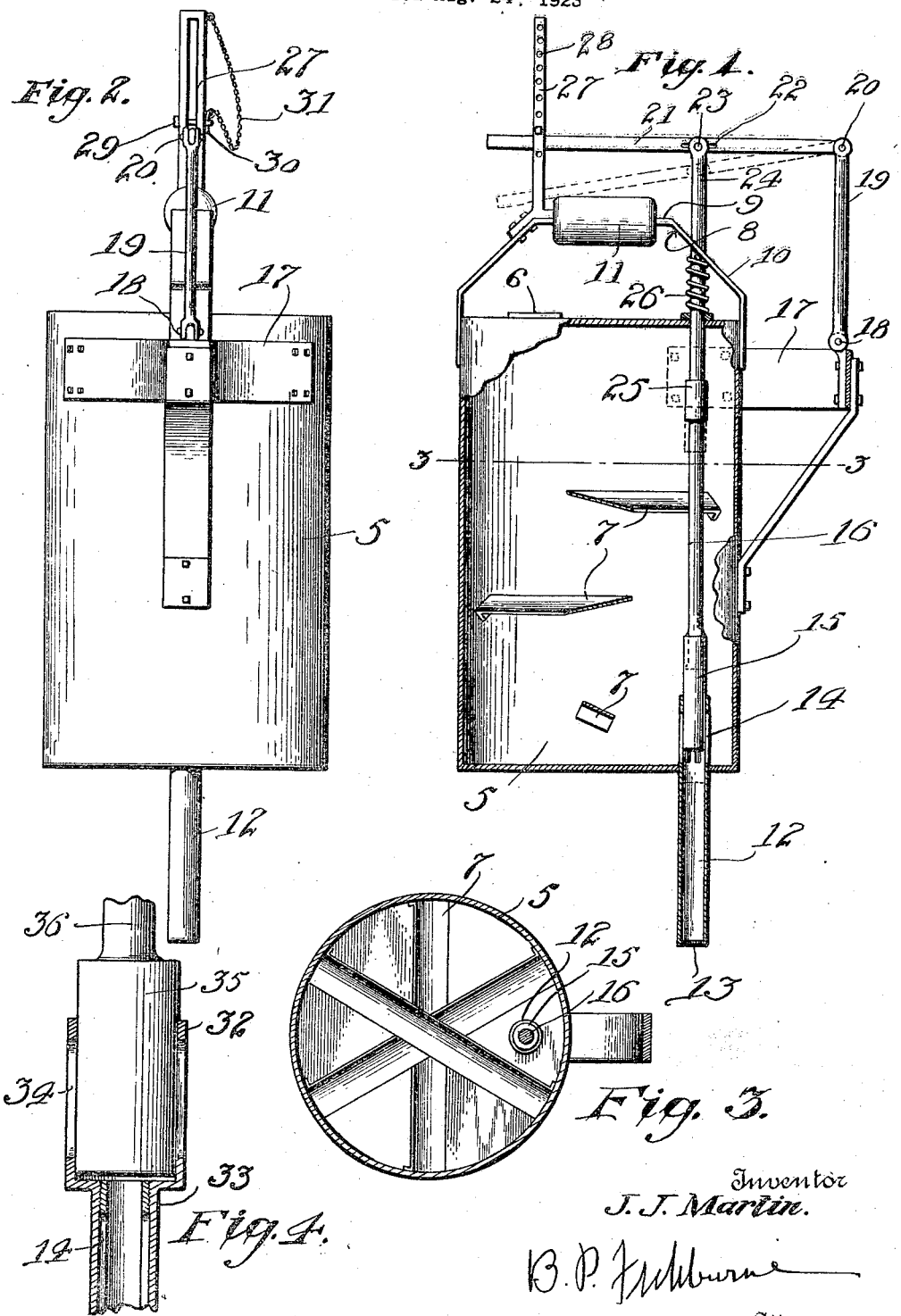

1,513,177

UNITED STATES PATENT OFFICE.

JAMES J. MARTIN, OF IVA, SOUTH CAROLINA.

FLUID-POISON-APPLYING DEVICE.

Application filed August 24, 1923. Serial No. 659,138.

*To all whom it may concern:*

Be it known that I, JAMES J. MARTIN, a citizen of the United States, residing at Iva, in the county of Anderson and State of South Carolina, have invented certain new and useful Improvements in Fluid-Poison-Applying Devices, of which the following is a specification.

My invention relates to a device for applying a small amount of fluid poison upon the buds of young cotton, for preventing or destroying the boll weevil.

An important object of the invention is to provide a device of the above mentioned character, which is simpler in construction, light, readily portable by holding in the hand, and which may be conveniently operated for discharging a selected amount of this fluid poison upon the bud.

A further object of the invention is to provide a device of the above mentioned character, having means for adjusting the amount of fluid poison discharged upon each operation of the device.

A further object of the invention is to provide a device of the above mentioned character, having means for agitating the fluid contents of the same, upon the turning of the device upon its longitudinal axis.

A further object of the invention is to arrange the supporting handle or bale and operating lever above the top of the receptacle or body portion of the device so that the device will be well balanced, and the same may be turned, and the lever actuated by one hand.

Other objects and advantages of the invention will be apparent during the course of the following description.

In the accompanying drawings forming a part of this specification, and in which like numerals are employed to designate like parts throughout the same, Figure 1 is a side elevation of the device embodying my invention, parts in central vertical section, Figure 2 is an elevation of the device, at a right angle to Figure 1, Figure 3 is the horizontal section taken on line 3—3 of Figure 1, and, Figure 4 is a detailed section through an auxiliary cylinder and plunger.

In the drawings, wherein for the purpose of illustration is shown a preferred embodiment of my invention, the numeral 5 designates the receptacle, which is preferably cylindrical. This receptacle is provided in its top with an opening which is covered by a removable cap 6 whereby the fluid poison ordinarily in the form of a thick liquid may be introduced.

Arranged within the lower portion of the receptacle 5, are preferably diametrically arranged agitating plates or strips 7, which cross at their centers and have their outer ends attached to the receptacle 5. These plates are vertically spaced and are transversely inclined or twisted. It might be stated at this point that the receptacle is ordinarily filled with the heavy liquid poison, which is kept thoroughly agitated by turning the receptacle 5, back and forth upon its longitudinal axis. The agitation is accomplished by the plates 7, as is obvious.

Extending over the top of the receptacle 5, and arranged diametrically thereof, is a handle or bale 8, the ends of which are readily attached to the receptacle 5. This bale has a central horizontal portion 9, and inclined portions 10. A hand grip 11, is mounted upon the central horizontal portion 9, as shown.

Connected with the bottom of the receptacle 5, by suitable means, is a barrel 12, extending above and below this bottom. The lower end of this barrel is preferably covered by a finely perforated plate 13. The upper portion of the barrel, projecting into the receptacle 5 is provided with openings 14, preferably in the form of elongated slots. Theses slots are adapted to be covered by a reciprocating plunger 15, carried by a plunger rod 16.

Attached to the side of the receptacle 5, preferably near its top is a bracket 17, to which is pivotally connected, at 18, a link 19. This link has pivotal connection at its upper end, at 20, with a vertical swinging lever 21. This lever has a slot 22, formed therein for receiving a pin 23, carried by the upper forked end of a connecting rod 24. This connecting rod is attached to the plunger rod 12, by means of a coupling 25.

The rod 24 extends through the opening in the top of the receptacle 5, and is urged upwardly by a coil spring 26. Lever 21 extends diametrically over the receptacle 5, in spaced parallel relation to the handle 8, and the free end of the lever 21 operates within a guide frame 27, vertically arranged near one end of the hand grip 11, and rigidly attached to the handle 8. The guide frame 27 has vertically spaced openings 28, and a bolt or stop element 29 or the like, is adapted to be inserted within selected openings 28, to limit the upward movement of the lever 21. The bolt 29 may have a transverse opening in its free end, for receiving a pin 30, carried by a chain 31 or the like.

I contemplate employing a larger auxiliary barrel 32, Figure 4, which is provided with a nipple 33 for screw-threaded engagement upon the top of the barrel 12, thereby closing the slot 14. This barrel 32, with the larger diameter also has elongated slots 34. The numeral 35 is the plunger secured to a rod 36 and adapted for connection with the coupling 25. The barrel 34 is employed when it is desired to greatly increase the volume of the liquid poison to be discharged at each operation.

Further, if desired a suitable nozzle may be mounted upon the lower end of the barrel 12, to discharge the liquid laterally or to spray it.

In operation, the stop element 29 is adjusted within the guide frame 27, to regulate the selected volume of the liquid poison to be discharged. The spring 26 automatically elevates the plunger 15, and the liquid poison will be drawn into the barrel. The lower end of the barrel 12, is now placed upon or near the bud of the cotton and the lever 21 depressed, by closing the hand carrying the grip 11. The poison is thus forced out of the barrel upon the bud. The receptacle 5 is ordinarily carried in a vertical position, and by turning the receptacle upon its longitudinal axis the contents thereof may be thoroughly agitated. This turning movement may be conveniently effected between the operations of the lever 21, without the necessity of the operator releasing the hand grip 11.

It is to be understood that the form of my invention herewith shown and described is to be taken as a preferred example of the same, and that various changes may be resorted to in the shape, size, and arrangement of parts without departing from the spirit of my invention or the scope of the subjoined claims.

Having thus described my invention, I claim.

1. A device for applying a fluid poison to the cotton bud, comprising a receptacle, a barrel extending longitudinally of the receptacle near its bottom, a handle attached to the top of the receptacle and extending substantially diametrically across the same, a bracket projecting laterally from the receptacle, an operating lever pivotally supported from the bracket and extending substantially diametrically across the top of the receptacle outwardly of the handle, an upstanding guide frame supported from the receptacle and receiving the free end of the lever therein, said frame having vertically spaced openings, a stop element for insertion within a selected opening, a plunger within the barrel, a rod connecting the plunger and lever, and a spring to move the rod upwardly.

2. A device for applying a fluid poison to the cotton bud, comprising a receptacle, a barrel extending longitudinally of the receptacle near its bottom, an inverted U-shaped handle attached to the top of the receptacle and extending across the same, a bracket attached to the receptacle and extending laterally therefrom, an operating lever pivotally connected with the bracket and extending across the handle, an upstanding element attached to the handle and arranged adjacent to the lever, a stop adjustably mounted upon the upstanding element and arranged in the path of travel of the lever, a plunger within the barrel, a rod connecting the plunger and lever, and a spring to move the rod upwardly.

3. A device for applying a fluid poison to the cotton bud, comprising a receptacle, a barrel extending longitudinally of the receptacle near its bottom, an inverted U-shaped handle attached to the top of the receptacle and extending across the same, an operating lever extending across the handle, means for pivotally supporting one end of the operating lever from the receptacle, an upstanding element attached to the handle and arranged adjacent to the operating lever, a stop element adjustably mounted upon the upstanding element and disposed in the path of travel of the lever, a plunger within the barrel, a rod connecting the plunger and lever, and a spring to move the rod upwardly.

In testimony whereof I affix my signature.

JAMES J. MARTIN.